US009800457B2

(12) United States Patent
Siegmund

(10) Patent No.: US 9,800,457 B2
(45) Date of Patent: Oct. 24, 2017

(54) NETWORK MANAGEMENT

(71) Applicant: Apple Inc., Cupertino, CA (US)

(72) Inventor: Dieter Siegmund, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 465 days.

(21) Appl. No.: 13/925,344

(22) Filed: Jun. 24, 2013

(65) Prior Publication Data

US 2013/0311635 A1 Nov. 21, 2013

Related U.S. Application Data

(62) Division of application No. 11/953,788, filed on Dec. 10, 2007, now Pat. No. 8,495,224.

(60) Provisional application No. 60/947,373, filed on Jun. 29, 2007.

(51) Int. Cl.
H04L 12/24 (2006.01)
H04L 29/12 (2006.01)

(52) U.S. Cl.
CPC ........ H04L 41/00 (2013.01); H04L 29/12028 (2013.01); H04L 61/103 (2013.01)

(58) Field of Classification Search
CPC .. H04L 41/00; H04L 29/12028; H04L 61/103
USPC ....................................................... 709/223
See application file for complete search history.

(56) References Cited

U.S. PATENT DOCUMENTS 6,681,244 B1 1/2004 Cross et al.
7,546,385 B1 6/2009 Henry et al.
7,895,339 B2 2/2011 Hirano et al.
2003/0142684 A1 7/2003 Miyachi
2004/0064559 A1 4/2004 Kupst et al.
2004/0093400 A1 5/2004 Richard et al.
2006/0002407 A1* 1/2006 Sakamoto ............... H04L 12/24 370/402
2006/0248230 A1* 11/2006 Kempf .................... H04L 29/12 709/245
2007/0022211 A1* 1/2007 Shimizu ............ H04L 29/12028 709/238
2007/0133544 A1* 6/2007 Shida .................. H04L 61/2046 370/392
2008/0065747 A1 3/2008 Kubota
(Continued)

OTHER PUBLICATIONS

Cheng et al., "An Efficient IP Traceback Approach", Feb. 2006, "The 2$^{nd}$ International Conference on Information Management and Business (IMB2006)", 18 pages.

Primary Examiner — Michael C Lai
(74) Attorney, Agent, or Firm — Sterne, Kessler, Goldstein & Fox P.L.L.C.

(57) ABSTRACT

Systems and methods relating to managing network addresses. In one implementation, a method is provided. The method includes sending a first request to use a particular network address, sending one or more second requests for respective hardware addresses corresponding to network addresses of one or more network address leases. When a hardware address corresponding to a particular network address lease is received in response to one of the one or more second requests and an acknowledgement of the first request to use the network address is not received determining whether the network address identified by the lease is the same as the network address in the first request, and when the network address is not the same, sending a third request to use the identified network address corresponding to the lease.

17 Claims, 5 Drawing Sheets

(56) References Cited

U.S. PATENT DOCUMENTS

2008/0189764 A1\* 8/2008 Gronholm ............... G06F 15/16
  726/3
2008/0250123 A1\* 10/2008 Chae ................. H04L 29/12028
  709/220
2009/0006635 A1 1/2009 Siegmund \* cited by examiner

NETWORK MANAGEMENT

RELATED APPLICATION

This application is a divisional of co-pending U.S. application Ser. No. 11/953,788 filed on Dec. 10, 2007, which claims the benefit of priority under 35 U.S.C. §119(e) of U.S. Provisional Patent Application Ser. No. 60/947,373, filed on Jun. 29, 2007, for "Network Management," the entire contents of which are incorporated by reference herein.

TECHNICAL FIELD

The subject matter of this specification relates to managing network addresses.

BACKGROUND

Conventional networks can join various devices including, for example, client devices (e.g., computers, printers, Internet fax, personal data assistant, mobile phone, other network adapters, etc.), server devices (e.g. data server, proxy server, time-server, etc.), and other network devices (e.g., routers, which interconnect, for example, multiple subnets of a network). The network allows data to be communicated between devices on the network. Conventional network devices are assigned a unique address that identifies the device on the network as well as facilitates communication between devices. For example, in a computer network utilizing the internet protocol (IP) standard, each device on the network is assigned a particular IP address.

An IP address can be static or dynamic. A static IP address is the same for a device each time the device connects to a network. A dynamic IP address, by contrast, is an IP address that is typically assigned to a device e.g., by a server for a specified time. The dynamic IP address can change, for example, after the specified amount of time has elapsed or each time the device accesses the network.

One protocol for assigning dynamic IP addresses is dynamic host configuration protocol (DHCP). DHCP defines a set of rules used to allow network devices to request and obtain an IP address from a DHCP server. A DHCP server can be a network server. However, other devices can act as a DHCP server including e.g. routers and firewalls. The DHCP server can include a collection of IP addresses available for assignment. Typically, an IP address is assigned for a specified period of time (e.g., an hour), after which the IP address is available for assignment to another device. Consequently, the IP address of a particular network device can vary over time. This assignment of an IP address for a specified period of time will be referred to in this specification as a lease.

SUMMARY

This specification describes technologies relating to managing network addresses. In general, in one aspect a method is provided. The method includes sending a first request to use a particular network address, sending one or more second requests for respective hardware addresses corresponding to network addresses of one or more network address leases. When a hardware address corresponding to a particular network address lease is received in response to one of the one or more second requests and an acknowledgement of the first request to use the network address is not received determining whether the network address identified by the lease is the same as the network address in the first request, and when the network address is not the same, sending a third request to use the identified network address corresponding to the lease. Other embodiments of this aspect include corresponding systems, apparatus, computer program products, and computer readable media.

Implementations of the aspect can included one or more of the following features. The aspect can further include sending a fourth request for a new network address when the network address is the same as the network address in the first request. The aspect can further include sending a fourth request for a new network address when hardware corresponding to a particular network address lease is not found. The aspect can further include using the network address of the first request when an acknowledgement of the first request is received. Sending the first and second requests can occur substantially contemporaneously in time. The first request can be a DHCP request and each second request can be an address resolution protocol request associated with a particular lease.

In general, in one aspect, a method is provided. The method includes identifying an assigned network address, receiving an announcement from a device including the assigned network address, determining whether to defend the assigned network address, and when the assigned network address is defended, sending a broadcast announcement identifying the assigned network address. Other embodiments of this aspect include corresponding systems, apparatus, computer program products, and computer readable media.

Implementations of the aspect can included one or more of the following features. The aspect can include releasing the assigned network address and requesting a new network address when the assigned network address is determined not to be defended. Determining whether to defend the assigned network address can include determining whether the assigned network address was assigned for more than a threshold period of time. The assigned network address can be not defended if the threshold period of time has not elapsed. Defending the assigned network address can be unsuccessful if a specified number of announcements are received including the assigned network address after sending the broadcast announcement. The aspect can further include releasing the assigned network address and requesting a new network address when the defense is unsuccessful.

In general, in one aspect, a method is provided. The method includes initiating an event that deactivates a client device, the client device including a plurality of leases, each lease being associated with a network address, identifying a current lease from the plurality of leases, and discarding all leases of the plurality of leases other than the current lease. Other embodiments of this aspect include corresponding systems, apparatus, computer program products, and computer readable media.

Implementations of the aspect can included one or more of the following features. The aspect can further include attempting to connect to a network using the current lease including sending a first request identifying the network address of the current lease and sending a second request requesting a new network address if the network address of the current lease is not acknowledged.

Particular embodiments of the subject matter described in this specification can be implemented to realize none, one, or more of the following advantages. A network connection can be rapidly established as a result of identifying a lease corresponding to the network. Identifying a particular valid lease for a network avoids the time necessary to request a new IP address. Old leases can be removed in particular circumstance to improve efficiency. Conflicts between IP address can be resolved including defending IP addresses under particular circumstances in order to avoid requesting a new IP address when a conflict arises.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
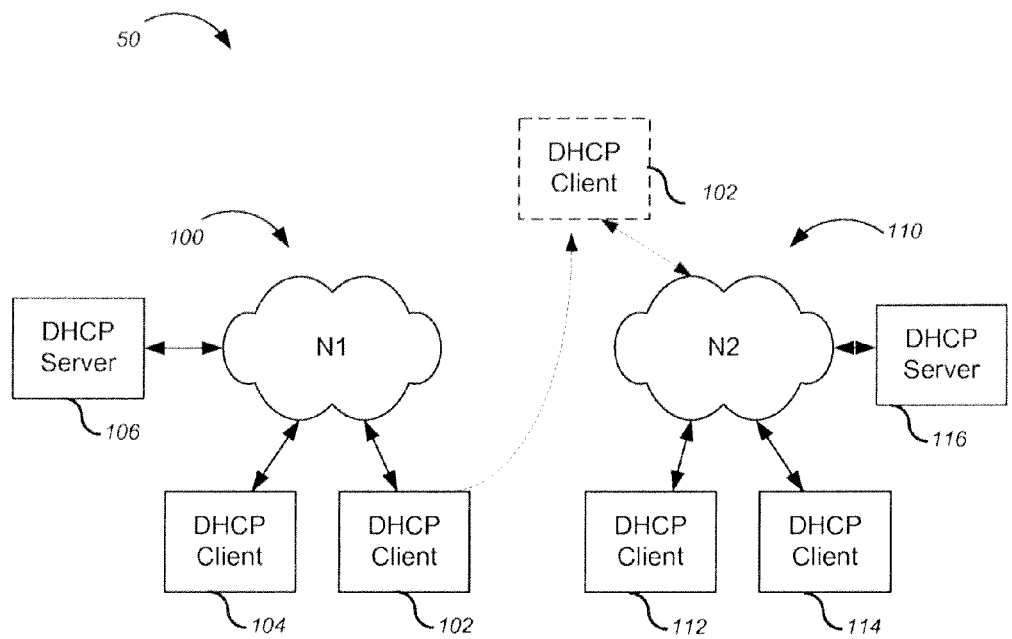
FIG. 1 is block diagram of example of two networks.

FIG. 1 is block diagram of an example network communication system 50 including two networks: a first network 100 and a second network 110. Each network links client devices. The first network 100 can be a network or a subnet and links client devices 102 and 104. The client devices 102 and 104 can be, for example, DHCP clients configured to receive assigned network addresses (e.g., IP addresses) according to DHCP. The first network 100 also includes a server 106. The server 106 can be, for example, a DHCP server. The server 106 can be a router, firewall, or other network device configured to assign network addresses to one or more client devices. Additionally, a network can include more than one server 106. When a DHCP client device (e.g., client device 102) joins the network, the client device requests and is assigned a particular IP address by the DHCP server (e.g. server 106).

Similarly, the second network 110 links client devices 112 and 114, which can also each be DHCP clients. The second network 110 can also be a network or subnet and also includes a server 116. The server 116 can be, for example, a DHCP server. When a DHCP client device (e.g., client device 112) joins the network, the client device requests and is assigned a particular IP address by the DHCP server (e.g., server 116).

In some implementations, a client device (e.g., client device 102) can move to another network. For example, the client device 102 can be a mobile device (e.g., a notebook computer, mobile phone, or other device). The client device 102 can disconnect from the first network 100 and move to a location where the client device 102 can access the second network 110. For example, a user can take a notebook computer joined to a home network (e.g., network 100) and transfer the notebook computer to another location (e.g., a coffee shop), served by a different network (e.g., network 110). In accessing the second network 110, the client device can request a new IP address for network 110 from server 116.

Figure 2A:
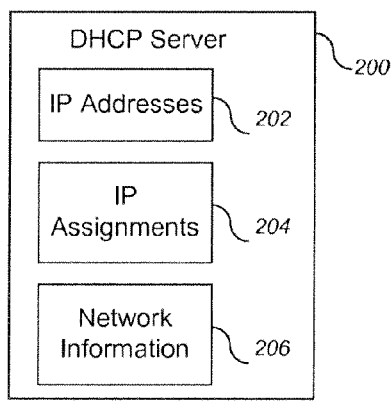
FIG. 2A is a block diagram of an example DHCP host

FIG. 2A is a block diagram of an example DHCP server 200. The DHCP server 200 includes IP addresses 202, IP assignments 204, and network information 206. The IP addresses 202 can include a pool of unique IP addresses that the DHCP server 200 assigns to particular devices (e.g., in response to a received DHCP request). The IP assignments 204 identify which IP addresses of the IP addresses 202 have been assigned to particular devices. The IP assignments 204 can also include other lease information, for example, the duration for which the IP address assigned to each device is valid. In some implementations, the assigned IP addresses are not persistently stored on the DHCP server such that if the DHCP server is rebooted or otherwise reinitiated the assignments are lost.

The network information 206 includes configuration information that can be supplied to devices (e.g., client devices 102) along with an IP address. The configuration information 206 can include, for example, subnet mask identifying a particular subnet, domain name system (DNS) server for mapping domain names to IP addresses, and default gateway information identifying one or more access points for the network.

Figure 2B:
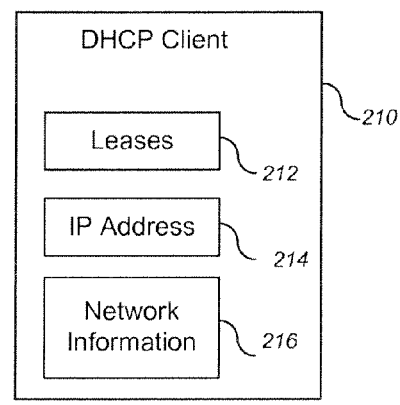
FIG. 2B is a block diagram of an example DHCP client.

FIG. 2B is a block diagram of an example DHCP client 210. The DHCP client 210 includes leases 212, IP address 214, and network information 216. The leases 212 can include one or more lease corresponding to one or more network addresses. For example, a separate lease can be stored on the DHCP client 210 for each network accessed by the DHCP client 210. Leases 212 can be valid or expired. Each lease 212 includes information specific to the particular lease, for example, the duration of the lease, the assigned IP address for the lease, and other network configuration information for the lease.

The network configuration information for the lease includes subnet mask, DNS server, and gateway information provided by the DHCP server (e.g., from DHCP server 200) that allows the DHCP client 210 to access and communicate data using the network. Additionally, the network configuration information can also include an identification of the particular DHCP server from which the lease was received (e.g., an IP address and/or media access control (MAC) address for a router acting as a DHCP server).

The IP address 214 identifies the currently assigned IP address for the DHCP client 210. For example, for a DHCP client 210 currently accessing a particular network, the IP address 214 is an IP address assigned by a particular DHCP server associated with that network. Similarly, the network information 216 identifies the network configuration information specific to accessing the particular network and can include e.g., a subnet mask, gateway, and DNS server.

Figure 3:
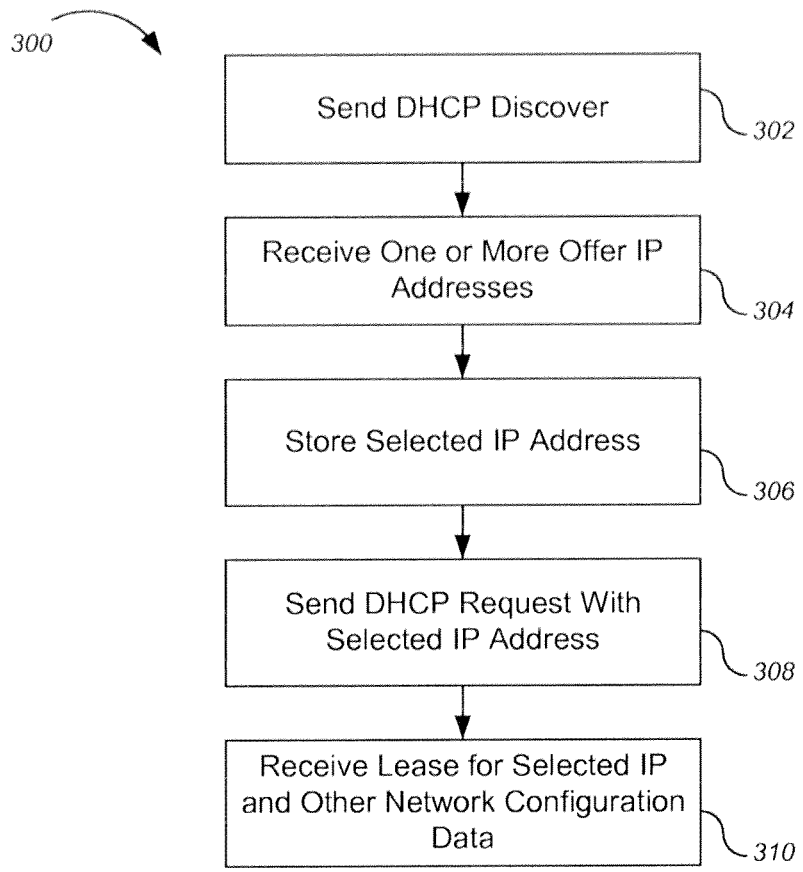
FIG. 3 illustrates an example process for obtaining a network address using DHCP.

FIG. 3 illustrates an example process 300 for obtaining a network address using DHCP. For convenience, the process 300 will be described with respect to a device (e.g. DHCP client 210) that performs the process 300. Additionally, while the process 300 is described with respect to IP addresses assigned using DHCP, the process 300 can be applied to other systems using dynamically assigned network addresses.

The DHCP client sends 302 a DHCP discover message. The DHCP discover message is a broadcast message sent to identify DHCP servers located on a network from which the DHCP client can obtain an IP address. The DHCP client receives 304 one or more offer IP addresses. For example, each DHCP server that receives the DHCP discover message can select an available IP address (e.g., from IP addresses 202) and offer it to the DHCP client. In some implementations, the DHCP server can mark the selected IP address as offered such that the DHCP server is prevented from offering the same IP address to another device before the DHCP client has an opportunity to respond to the offer.

The DHCP client selects 306 a particular offer and stores the offered IP address (e.g. as assigned IP address 214). Additionally, the DHCP client sends 308 a DHCP request to a selected offer or (e.g., the offering DHCP server of the selected IP address) that includes the selected offer. The DHCP request is sent as a broadcast message so that any other DHCP servers that submitted offers that were not selected are notified of the DHCP client selection and can return the offered IP addresses to the respective available IP addresses. The DHCP server corresponding to the selected offer allocates the IP address to the user for a specified lease period.

The DHCP client receives 310 the lease for the selected IP address along with network configuration data. For example, the DHCP server can send a unicast acknowledgment message acknowledging the assignment of the IP address (e.g., an ACK message). The ACK message indicates that the IP address has been assigned to the DHCP client and that DHCP client can now use the IP address. In some implementations, the DHCP client can verify that the received IP address is unique, referred to as duplicate address detection. For example, the DHCP client can send out an address resolution protocol (ARP) request for the assigned IP address. If no response is received, the DHCP client has verified that no other device has been assigned the IP address.

Figure 4:
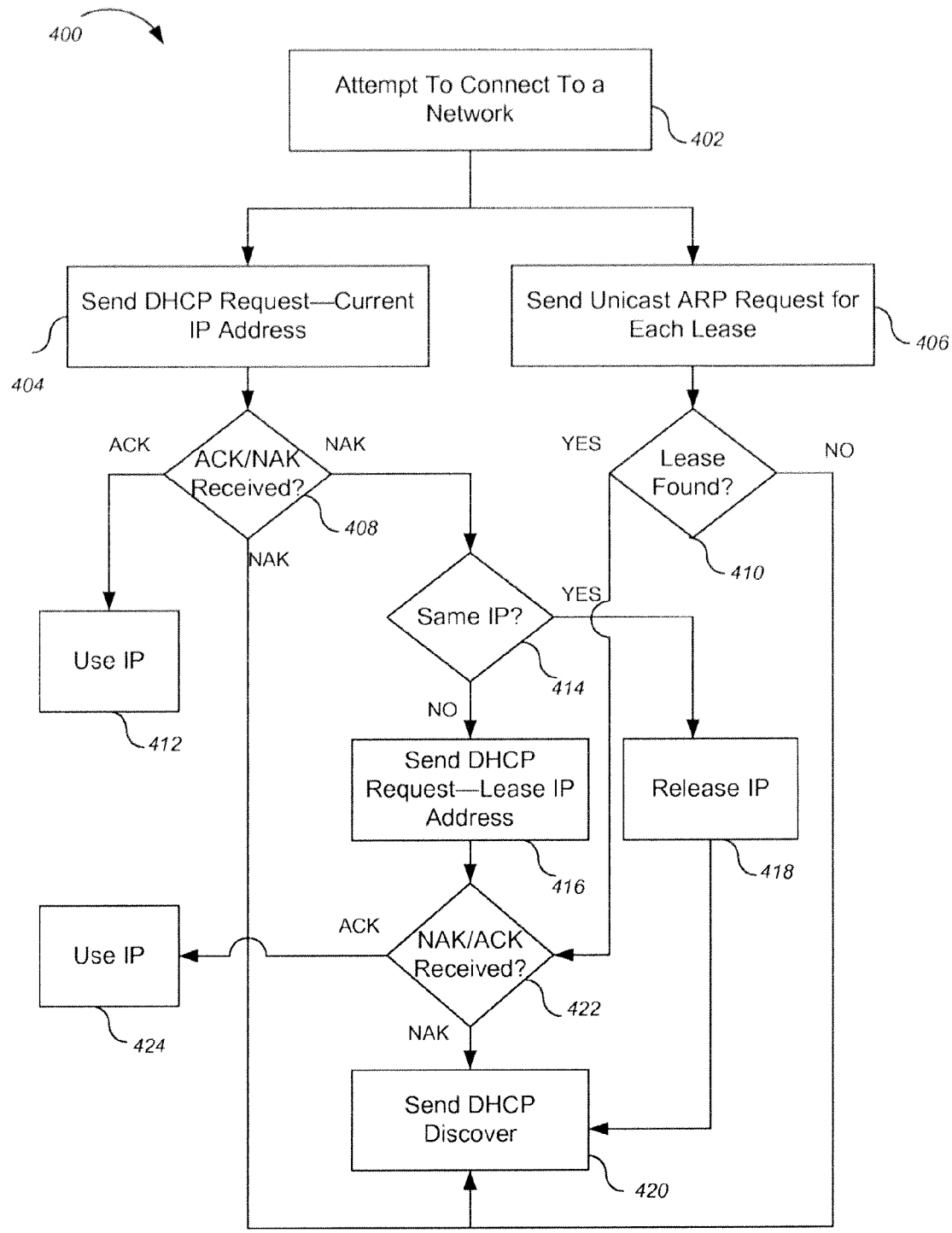
FIG. 4 illustrates an example process for connecting to a network.

FIG. 4 illustrates an example process 400 for connecting to a network. For convenience, the process 400 will be described with respect to a device (e.g., DHCP client 210) that performs the process 400.

The DHCP client attempts 402 to connect to a network. For example, the DHCP client could have become disconnected from a particular network (e.g., by unplugging a cable, moving beyond a wireless network range). Alternatively, the DHCP client can move to a different location and then attempt to connect to the network available at that location.

The DHCP client sends 404 a DHCP request according to the currently assigned IP address. The DHCP request is a broadcast message identifying the IP address. For example, the DHCP client broadcasts the current IP address indicating that the DHCP client would like to connect to the network using the current IP address.

Additionally, the DHCP client sends 406 unicast ARP requests for each lease stored on the DHCP client. Each ARP request is directed to the DHCP sever (or in the case of all-subnets-local, some other non-subnet-local address e.g. the first DNS server address). The ARP request is directed to the server's particular hardware address (e.g., MAC address), i.e., sent unicast. The target IP address in the ARP request is set to the IP address of the server and the sender IP address is set to the leased IP address. The DHCP client determines 410 if a lease is found 410. If a lease is found and if the DHCP client receives an ACK message, the IP address is valid and the DHCP client uses 424 the IP address. The least duration is extended. If a NAK message is received using the IP address of the identified lease, the lease can be discarded and the DHCP client sends 420 a new DHCP discover request to obtain a new IP address and lease for the network.

In some implementations, the ARP requests are sent back to back until an ARP request has been sent that corresponds to each stored lease. ARP requests are typically broadcast requests. However, sending the ARP requests as unicast messages allows the target IP address to be a private address (e.g., for DHCP routers that do not have public IP addresses) without broadcasting the private IP address. In some implementations, the DHCP request and the ARP requests are sent substantially contemporaneously in time.

Returning to the DHCP request, the DHCP client receives 408 either an acknowledgment (ACK) message or a not acknowledged (NAK) message. If the DHCP client receives an ACK message, the IP address provided in the DHCP request is valid for the network. The ACK message indicates that the IP address is accepted for the network and, in some implementations, extends the lease duration as well as updates network configuration information. For example, the DHCP client can be reconnecting (within the lease period) to a same network from which the DHCP client was earlier disconnected. The DHCP client can then use 412 the IP address.

Typically, if a NAK message is received, the IP address is discarded and a new DHCP discover process takes place. However, in process 400, if the DHCP client receives a NAK message, the DHCP client notes the NAK message, but does not immediately act on the NAK message (i.e., does not initiate DHCP discover process). Instead, the DHCP client waits until the results of the unicast ARP requests are available.

A NAK message can be received, for example, because the IP address is not available or not valid for the network. For example, if the lease period has expired, the IP address identified in the DHCP request may have already been assigned to another device. The IP address therefore is unavailable to the DHCP client. Alternatively, in another example, the DHCP client can move from one network to another. A DHCP request identifying the IP address from one network may not be valid in another network. Generally, however, receiving a NAK message does not, by itself, indicate the reason for the NAK.

If a response to an ARP request is not received after sending a request for each stored lease, and a NAK was received in response to the DHCP request, the DHCP client sends 420 a DHCP discover message to obtain a new IP address and lease for the network. For example, if the DHCP client has not previously connected to the network, or the lease has been deleted, a new lease is required. The DHCP discover request is used to receive IP offers from one or more DHCP servers as described above with respect to FIG. 3.

If a response to an ARP request is received, the DHCP client checks the received MAC address with the MAC address information stored with the corresponding lease. This verifies that the ARP response was actually sent from the assigning device (e.g. a router having that particular MAC address and IP address). If the DHCP client verifies that the response to the ARP request was sent from the correct device, the DHCP client switches to the corresponding lease. In some implementations, switching includes changing the IP assignment and network configuration information for the DHCP client to correspond to the lease information.

If the DHCP client received a NAK message but identified a lease that is valid for the network, the DHCP client determines 414 whether the same IP address as identified in the lease was used for the DHCP request. If the same IP address was used, then the NAK message was correct and the DHCP client releases 418 the IP address. For example, this can occur when the DHCP server determines a new IP address should be issued instead of allowing the DHCP client to continue using the old one. Thus, even though the IP address and lease was correct for the network, the IP address is no longer accepted by the DHCP server. In this case, the lease is discarded and the DHCP client sends 420 a new DHCP discover message in order to obtain a new IP address and lease for the network.

If the IP address in the identified lease is not the same IP address as used in the DHCP request, the NAK message is ignored. For example, if the DHCP request identified an IP address for a different network, the NAK message is irrelevant because the DHCP server is not authoritative for that IP address (and associated lease). The IP address for the DHCP client is switched to the IP address in the identified lease. A new DHCP request is sent 416 using the IP address of the switched lease. The DHCP client receives 422 either an acknowledgment (ACK) message or a not acknowledged (NAK) message. If the DHCP client receives an ACK message, the IP address is valid. The DHCP client uses 424 the IP address and the lease duration is extended. If a NAK message is received using the IP address of the identified lease, the lease can be discarded and the DHCP client sends 420 a new DHCP discover request to obtain a new IP address and lease for the network.

Figure 5:
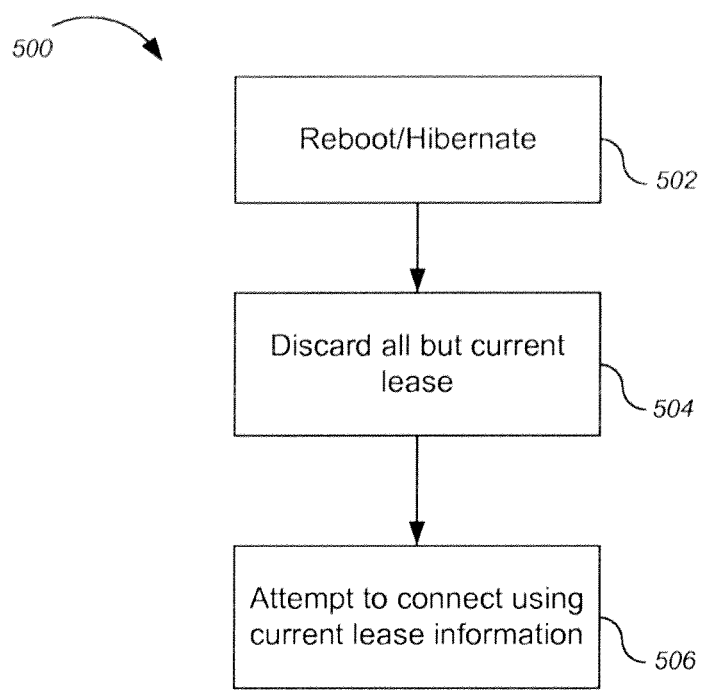
FIG. 5 illustrates an example process for clearing leases.

FIG. 5 illustrates an example process 500 for managing leases. For convenience, the process 500 will be described with respect to a device (e.g., DHCP client 210) that performs the process 500.

A particular DHCP client can collect a large number of leases. For example, if a DHCP client switches between multiple networks, the DHCP client can store separate leases for each network. In some implementations, when a reboot or hibernate event occurs, a different instance of the operating system can be initiated when the DHCP client is reactivated. The other OS instance (e.g., a Mac OS X or Windows instance) can have DHCP capability. However, the DHCP exchanges performed by the other OS instance can invalidate any leases currently stored. In particular, a DHCP client has the ability to relinquish a lease by sending a DHCP Release. Consequently, a number of invalid leases can be stored on the DHCP client.

The DHCP client initiates 502 an event that deactivates the DHCP client, for example, a reboot or hibernation event. A reboot can occur, for example, in response to a user input to shutdown or restart the DHCP client. A hibernation state typically refers to a low power operation where the contents of RAM are written to non-volatile memory, e.g., a hard disk before powering off a particular device. Consequently, the device can be restored to the same state as when the hibernation was invoked. For example, the DHCP client can be a mobile computer that can operate on battery power. The DHCP client can invoke a hibernation event (e.g., in response to a user input or automatically), for example, when battery power becomes less than a threshold level.

When a reboot or hibernation event occurs, the DHCP client discards 504 all but the current lease. For example, if four leases are stored on the DHCP client, the current lease is identified (e.g., as the lease corresponding to the currently assigned IP address and/or network configuration information). Once the current lease is identified, the remaining leases can be discarded. As a result, once the DHCP client is reactivated, there is only one lease stored.

The DHCP client attempts 506 to connect to a network using the current lease information. For example, the DHCP client can send a DHCP request identifying the IP address of the current lease. If an ACK message is received, the DHCP client continues to use the IP address. Additionally, the lease duration can be extended by the DHCP server. If a NAK message is received, a new DHCP discover process (e.g. as shown in FIG. 3) can occur to obtain a new IP address for the network.

In some implementations, if a DHCP server is restarted, the IP assignments made by the DHCP server are lost (e.g., they are not stored in persistent memory). As a result, the DHCP server can reassign IP addresses that already are the subject of valid leases. Thus, a device (e.g., another DHCP client) can enter the network that has an IP address from a previously assigned, but still valid lease. The device can broadcast its IP address upon joining the network according to that lease for the IP address even though the IP address was reassigned, e.g., to the DHCP client, creating a conflict.

Figure 6:
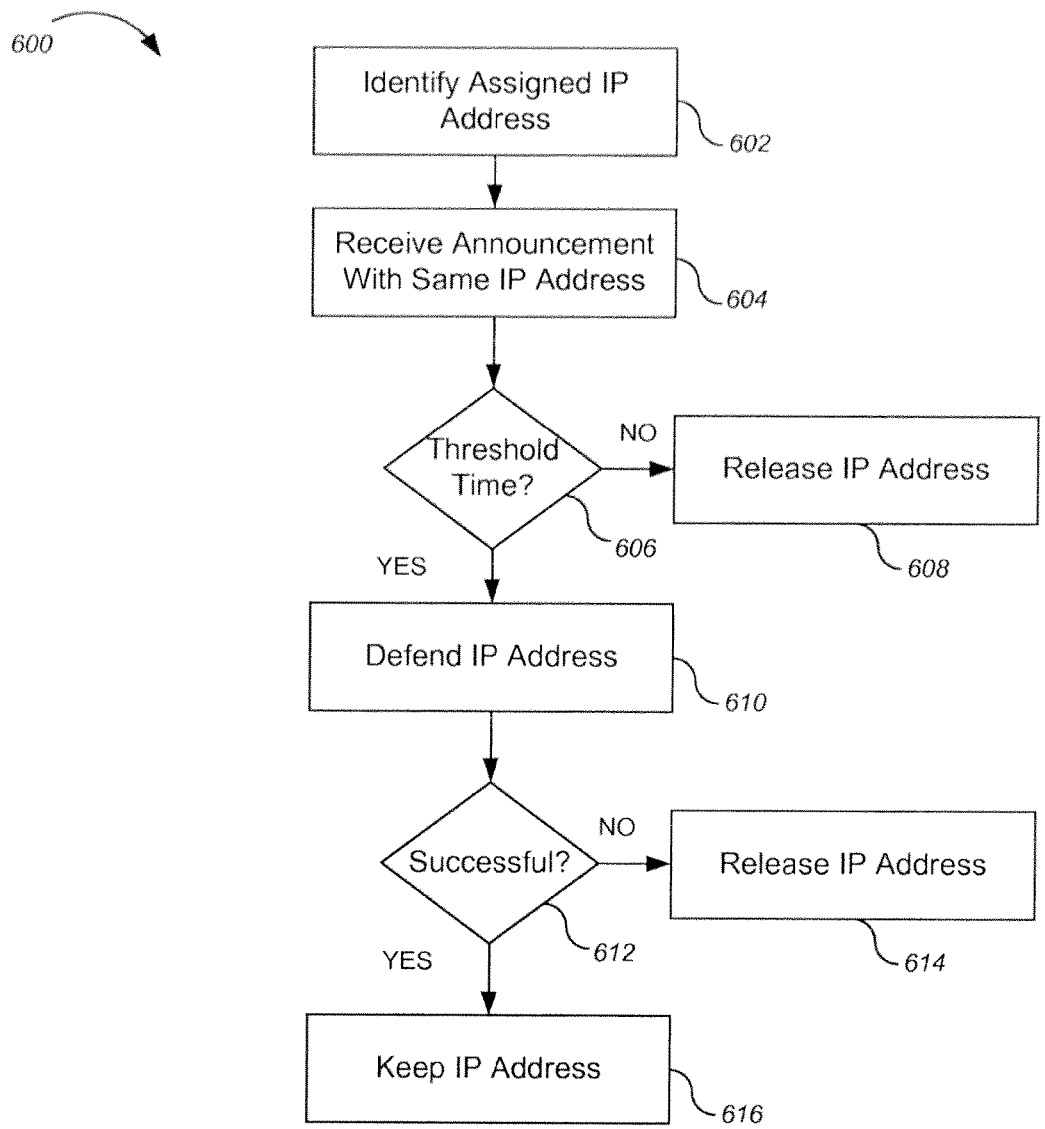
FIG. 6 illustrates an example process for managing network address conflicts.

FIG. 6 illustrates an example process 600 for managing network address conflicts. For convenience, the process 600 will be described with respect to a device (e.g., DHCP client 210) that performs the process 600.

The DHCP client identifies 602 an assigned IP address. For example, the identified IP address can be an IP address received from a DHCP server in response to a DHCP discover process (e.g., as shown in FIG. 3 above). Alternatively, the identified IP address can be a currently stored IP address or one identified from a current lease. Additionally, the identified IP address can be an IP address for which an ACK message was received in response to a DHCP request.

The DHCP client receives 604 an announcement with the same IP address. The announcement can be received, for example, as a broadcast ARP message sent from another device (e.g., a different DHCP client arriving at the network). For example, a device can enter the network and send a broadcast ARP message identifying the IP address the device intends to use on the network.

The DHCP client determines 606 whether a threshold time has elapsed since the IP address of the DHCP client was identified. For example, a threshold time from when an ACK message was received in response to a DHCP request associated with that IP address. In some implementations, the threshold period is substantially thirty seconds.

If the threshold time has not elapsed, the DHCP client releases 608 the IP address. Thus, the device associated with the received broadcast ARP message can be allowed to use the IP address. The DHCP client can then request a new IP address, e.g. though the DHCP discover process (e.g., as shown in FIG. 3 above).

If the threshold time has elapsed, the DHCP client defends 610 the identified IP address. In some implementations, the DHCP client sends a broadcast ARP message announcing the IP address of the DHCP client. The purpose of the broadcast ARP message from the DHCP client is to notify the other device that IP address is already being used on the network.

The DHCP client determines 612 whether the defense was successful. In some implementations, if after sending the ARP message, the DHCP client does not receive any other ARP messages with the same IP address within a specified period of time, then the defense is successful. In some implementations, if the DHCP client receives more than a specified number of ARP messages within a specified time period (e.g., more than three messages in thirty seconds) then the defense is considered unsuccessful. For example, the arriving device can keep broadcasting ARP messages with the IP address in response to the broadcast of the DHCP client in order to maintain a claim for the IP address. In that case, the DHCP client can release the IP address.

If the DHCP defense is not successful, the DHCP client releases 614 the IP address. The DHCP client can then request a new IP address, e.g. though the DHCP discover process as shown in FIG. 3. If the DHCP defense is successful, the DHCP client keeps 616 the IP address, which is used by the DHCP client for accessing the network.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g. a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g. visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g. a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The DHCP client can be part of a computing device or system. An example computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer).

The hard drive controller is coupled to a hard disk suitable for storing executable computer programs, including programs embodying aspects of the subject matter described in this specification.

The video controller is coupled to a video recorder, which can be used for storing and importing video footage and for writing final output.

The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link.

Also coupled to the I/O bus is a display and a keyboard. Alternatively, separate connections (separate buses) can be used for the I/O interface, display and keyboard.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    identifying a network address assigned to a first device by a lease, wherein the network address is configured to be used by the first device to access a network;
    receiving an announcement from a second device identifying the network address;
    determining a period of time that the network address has been assigned to the first device;
    determining to defend the network address in response to the period of time being equal to or more than a threshold period of time, wherein the threshold period of time is distinct from a period of the lease;
    determining to release the network address in response to the period of time being less than the threshold period of time; and
    in response to determining to defend the network address, transmitting a broadcast announcement identifying the network address.

2. The method of claim 1, further comprising:
    receiving a specified number of announcements, wherein each of the specified number of announcements comprises the network address.

3. The method of claim 2, wherein the specified number of announcements is received within another threshold period of time after transmission of the broadcast announcement.

4. The method of claim 2, wherein the announcements include at least one address resolution protocol message, and the specified number of announcements are received within a second period of time.

5. The method of claim 4, further comprising:
    determining that the specified number of announcements exceeds a threshold value; and
    determining whether defending the network address was successful based on determining that the specified number of announcements exceeds the threshold value.

6. The method of claim 1, further comprising:
    requesting another address in response to determining to release the network address.

7. The method of claim 6, wherein requesting the another address comprises:
    transmitting a discover message;
    receiving a first offer message from a first server and a second offer message from a second server in response to transmitting the discover message, wherein the first offer message includes a second network address and the second offer message includes a third network address;
    selecting the another address based on receiving the first offer message and the second offer message; and
    transmitting a response message to the first server and the second server, wherein the response message includes the selected another address.

8. The method of claim 7, further comprising:
    receiving a lease including the selected another address and network configuration data.

9. The method of claim 1, wherein the threshold period of time comprises a time from which an acknowledgement message associated with the lease is received by the first device.

10. The method of claim 9, wherein the acknowledgement message comprises an acknowledgement request associated with the network address.

11. The method of claim 1, wherein the threshold period of time comprises a time from which the network address is identified.

12. A computer comprising:
    a memory;
    a processor coupled to the memory and configured to:
        identify a network address assigned to the computer by a lease, wherein the network address is configured to be used by the first device to access a network;
        receive an announcement identifying the network address;
        determine a period of time that the network address has been assigned to the first device;
        determine to defend the network address in response to the period of time being equal to or more than a threshold period of time,
    wherein the threshold period of time is distinct from a period of the lease;

determine to release the network address in response to the period of time being less than the threshold period of time;

request another address in response to determining to release the network address, wherein requesting another address comprises:

transmitting a discover message;

receiving an offer message in response to transmitting the discover message, wherein the offer message includes an offered address; and transmitting a response message, wherein the response message includes the offered address; and in response to determining to defend the network address, transmit a broadcast announcement identifying the network address.

13. The computer of claim 12, wherein the processor is further configured to:

receive a specified number of announcements, wherein each of the specified number of announcements comprises the network address.

14. The computer of claim 13, wherein the announcements include at least one address resolution protocol message, and the specified number of announcements are received by the computer within a second period of time.

15. The computer of claim 14, wherein the processor is further configured to:

determine that the specified number of announcements exceeds a threshold value; and determine whether defending the network address was successful based at least in part on determining that the specified number of announcements exceeds the threshold value.

16. A non-transitory computer-readable storage medium storing instructions that, when executed by a processor in a device, cause the device to perform a method comprising:

identifying a network address assigned to the device by a lease, wherein the network address is configured to be used by the first device to access a network;

receiving an announcement from a device identifying the network address;

determining a period of time that the network address has been assigned to the first device;

determining to defend the network address in response to the period of time being equal to or more than a threshold period of time, wherein the threshold period of time is distinct from a period of the lease;

determining to release the network address in response to the period of time being less than the threshold period of time;

requesting another network address in response to determining to release the network address, wherein requesting the another network address comprises:

transmitting a discover message;

receiving a first offer message from a first server and a second offer message from a second server in response to transmitting the discover message, wherein the first offer message includes a second network address and the second offer message includes a third network address;

selecting the another network address based on the first offer message and the second offer message; and transmitting a response message to the first server and the second server, wherein the response message includes the selected another network address; and in response to determining to defend the network address, transmitting a broadcast announcement identifying the network address.

17. The non-transitory computer-readable storage medium of claim 16, wherein the method further comprises:

receiving a specified number of announcements, wherein each of the specified number of announcements comprises the network address.

* * * * *